Figure 4:
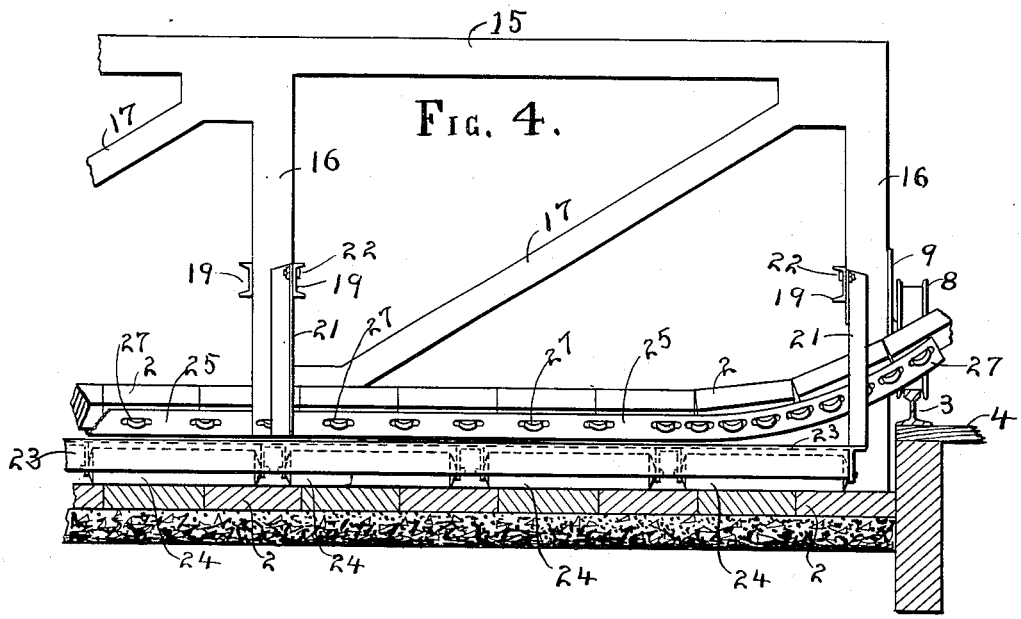

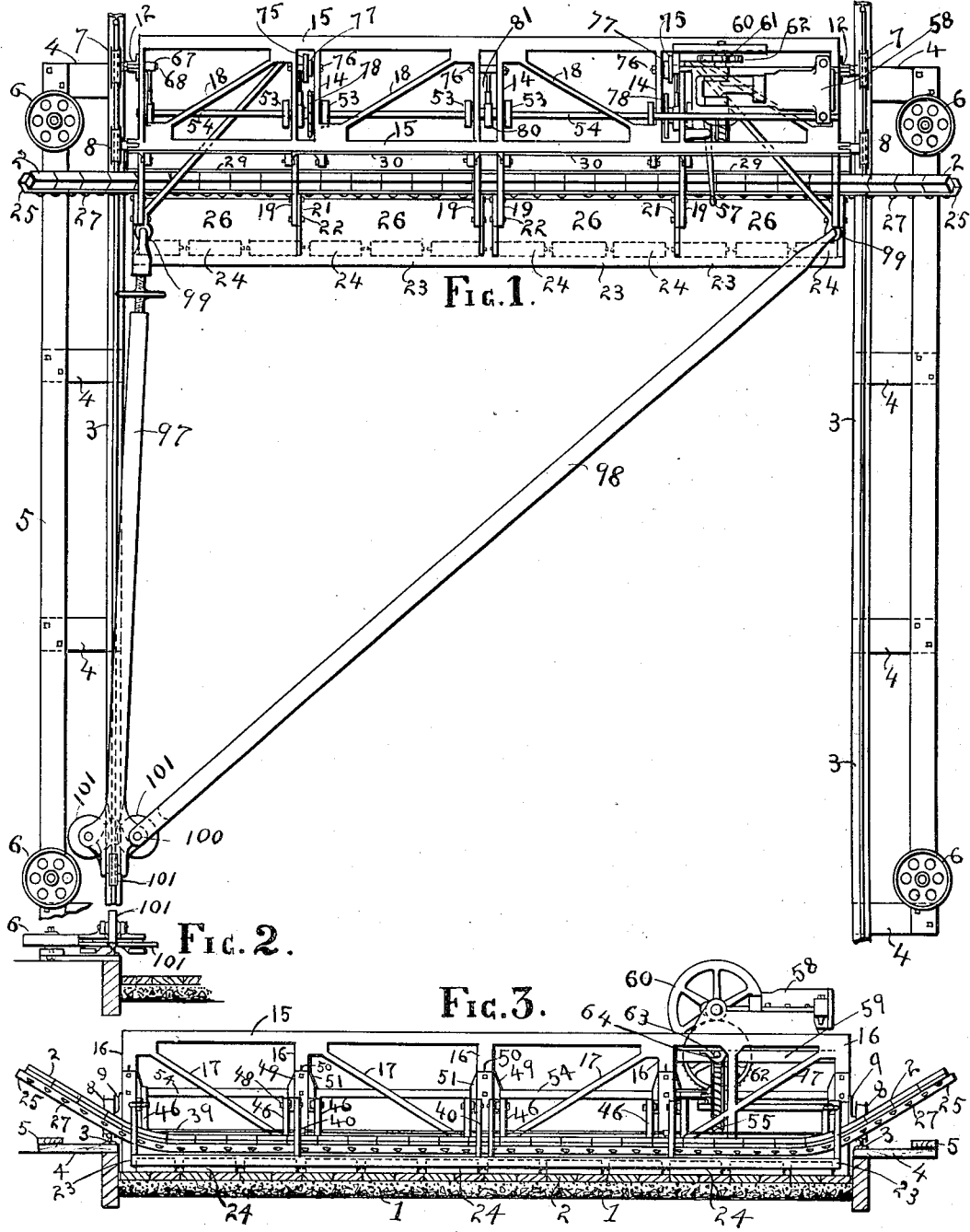

W. BAYLEY.
APPARATUS FOR AND PROCESS OF LAYING PAVING MATERIAL.
APPLICATION FILED APR. 5, 1909.

992,538.

Patented May 16, 1911.

8 SHEETS—SHEET 2.

WITNESSES:
F. W. Schaefer.
Edward Reed.

INVENTOR
William Bayley.
BY
H. A. Toulmin
ATTORNEY

W. BAYLEY.
APPARATUS FOR AND PROCESS OF LAYING PAVING MATERIAL.
APPLICATION FILED APR. 5, 1909.
992,538.
Patented May 16, 1911.
8 SHEETS—SHEET 3.
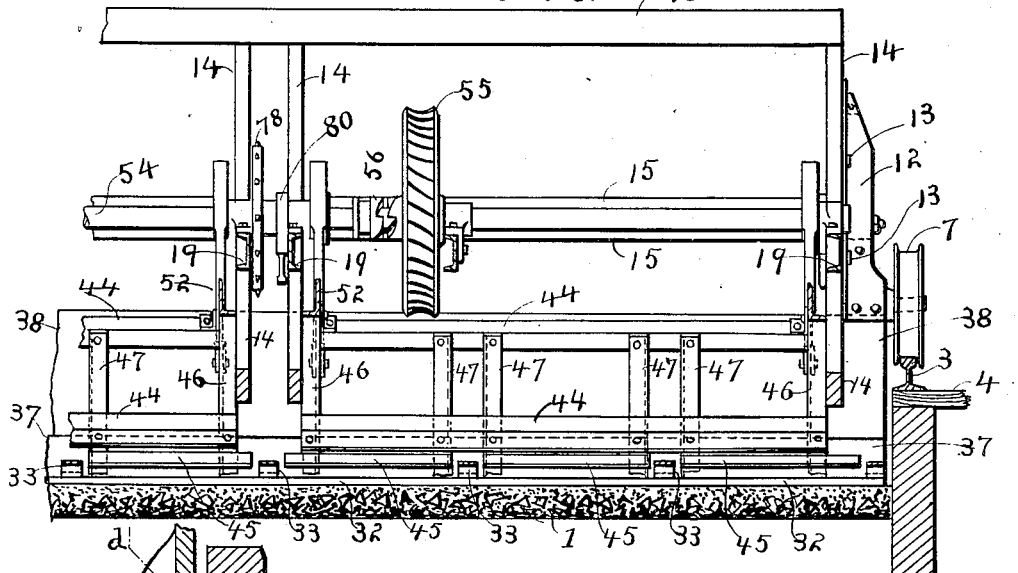
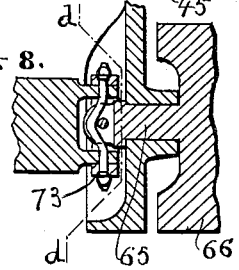
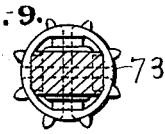
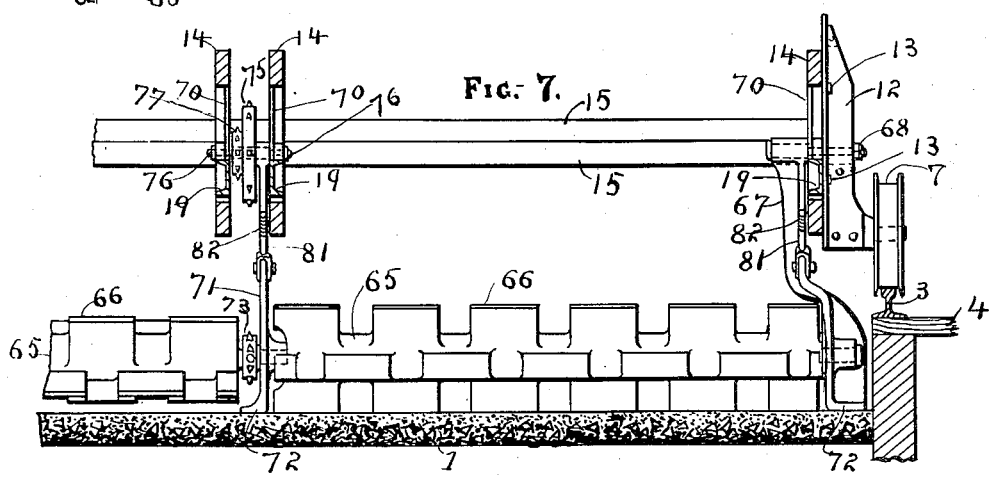
WITNESSES:
F. W. Schaefer
Edward A. Reed
INVENTOR
William Bayley,
BY
H. A. Toulmin
ATTORNEY W. BAYLEY.
APPARATUS FOR AND PROCESS OF LAYING PAVING MATERIAL.
APPLICATION FILED APR. 5, 1909.

992,538.

Patented May 16, 1911.

8 SHEETS—SHEET 4.

WITNESSES:

INVENTOR
William Bayley,
BY
ATTORNEY

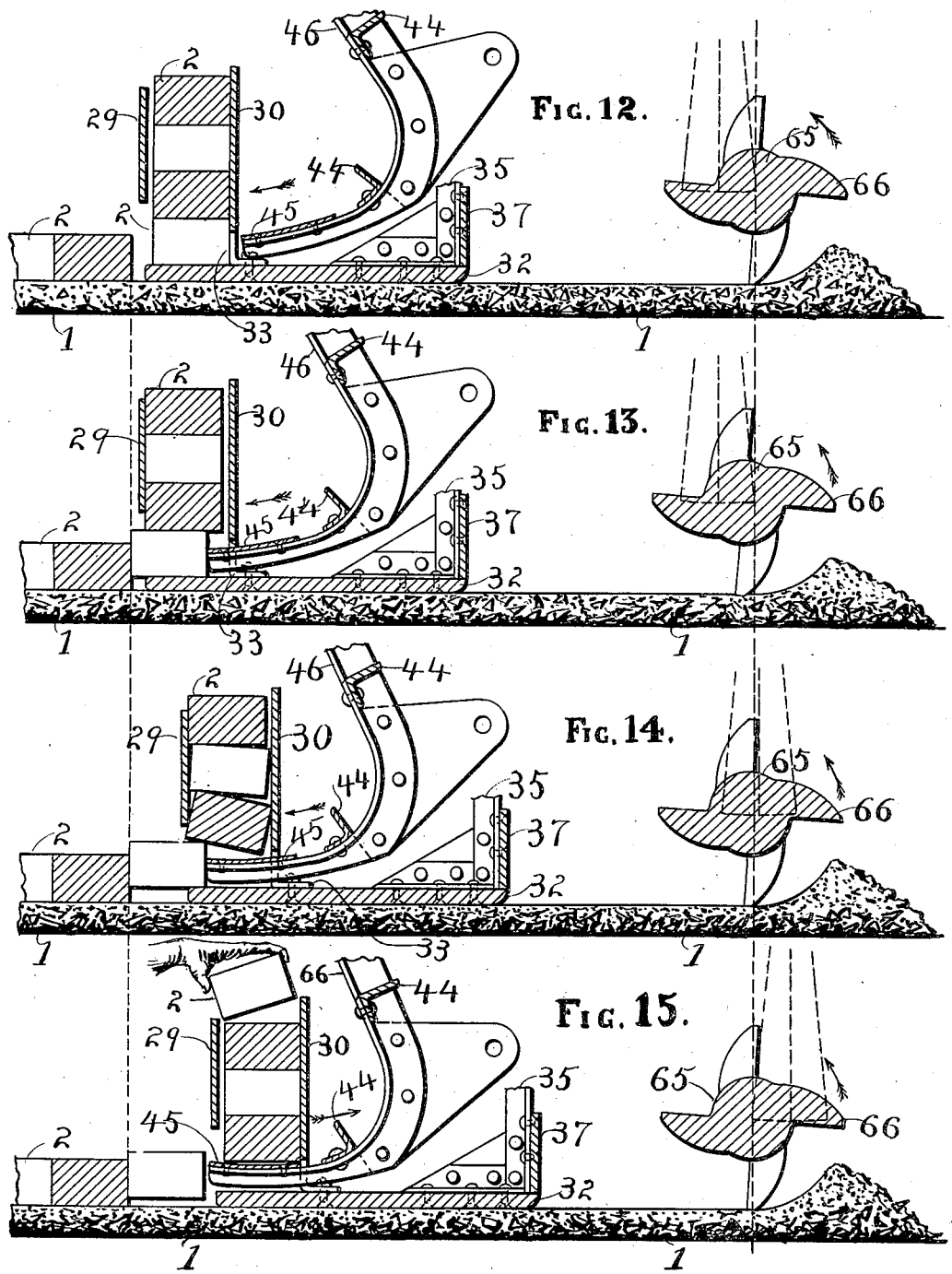

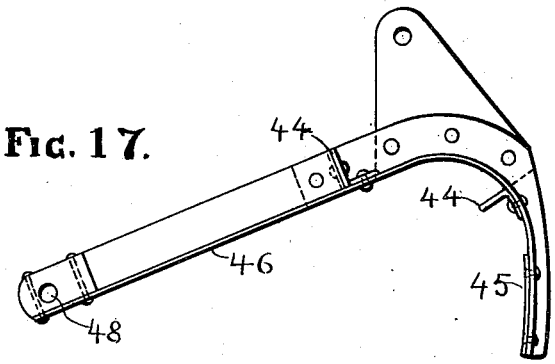
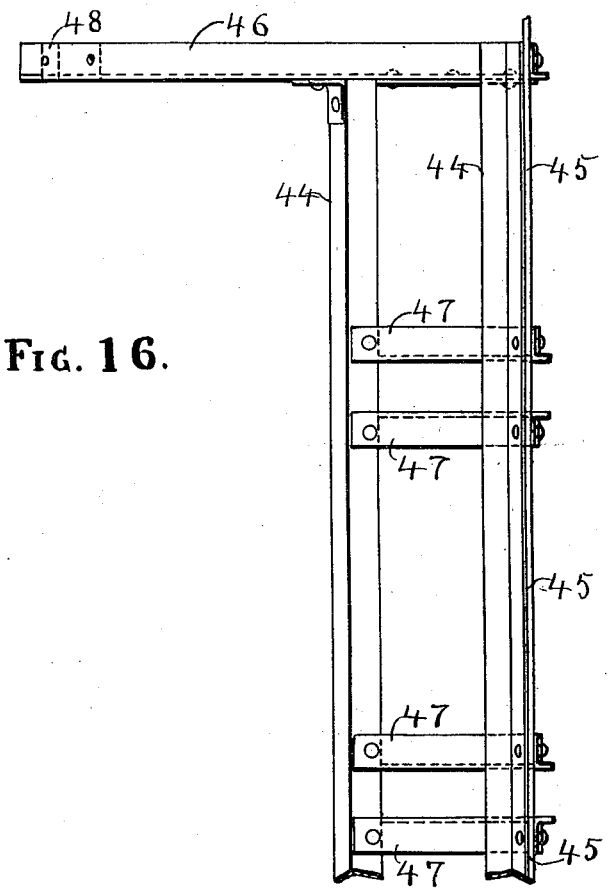

W. BAYLEY.
APPARATUS FOR AND PROCESS OF LAYING PAVING MATERIAL.
APPLICATION FILED APR. 5, 1909.

992,538.

Patented May 16, 1911.

8 SHEETS—SHEET 7.

W. BAYLEY.
APPARATUS FOR AND PROCESS OF LAYING PAVING MATERIAL.
APPLICATION FILED APR. 5, 1909.
992,538.
Patented May 16, 1911.
8 SHEETS—SHEET 8.
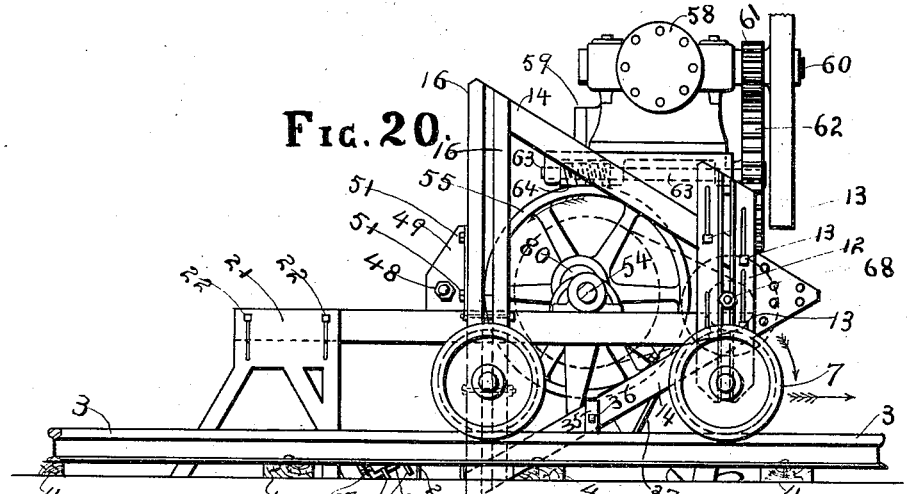
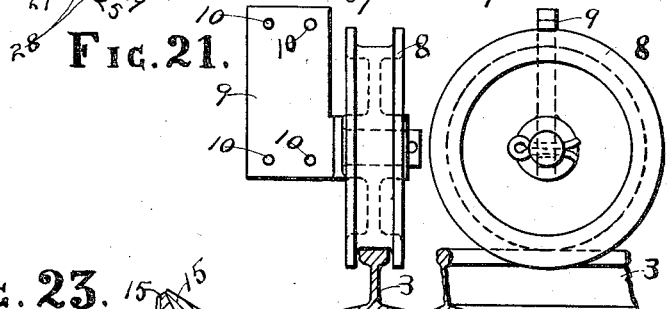
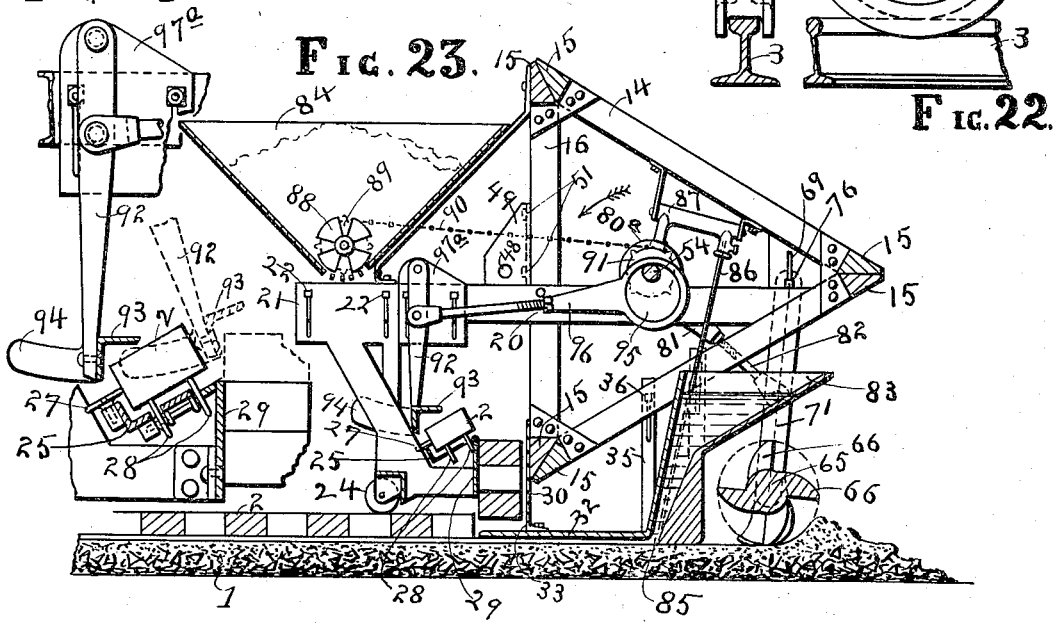
WITNESSES:
F. W. Schaefer
Edward L. Reed
INVENTOR
William Bayley
BY
H. A. Toulmin
ATTORNEY

UNITED STATES PATENT OFFICE.

WILLIAM BAYLEY, OF SPRINGFIELD, OHIO.

APPARATUS FOR AND PROCESS OF LAYING PAVING MATERIAL.

992,538.        Specification of Letters Patent.     Patented May 16, 1911.

Application filed April 5, 1909. Serial No. 488,107.

*To all whom it may concern:*

Be it known that I, WILLIAM BAYLEY, a citizen of the United States, residing at Springfield, in the county of Clark and State of Ohio, have invented certain new and useful Improvements in Apparatus for and Process of Laying Paving Material, of which the following is a specification, reference being had therein to the accompanying drawings.

This invention relates to an apparatus for laying street or road paving material, as paving brick, stone or composition blocks, or similar material. Heretofore it has been the practice to lay street and other similar pavements solely by hand.

This invention is to displace the old method and to substitute therefor an apparatus by which this heretofore arduous and expensive work shall be done more expeditiously, economically and perfectly.

The preferred form of my apparatus comprises a general frame, which is adapted to travel over the road-bed which is to be paved and to bridge or span the same, and contains means for receiving the paving blocks and properly distributing them, in the nature of a feeder; means for receiving the blocks from the feeder to hold them in readiness to be discharged upon the bed or paving foundation, in the nature of a hopper or holder; means to eject or move the blocks from or between the holding hopper to paving-position; means to advance the machine forward as the paving of one or more rows of blocks is accomplished, and other means for leveling the grouting or other top dress of the foundation upon which the blocks are to be placed, so that this leveling shall proceed progressively as the material is wanted; the machine being self-contained, in the sense that it carries its own motor for operating its several mechanisms and for advancing it as the work of laying the blocks proceeds.

My invention comprehends also such modifications as would include the enumerated means or features with others, or with necessary adjuncts, as well as a machine having some or less than all of these features, as I consider myself the first to devise a machine which will mechanically lay paving blocks of any character.

Figure 5:
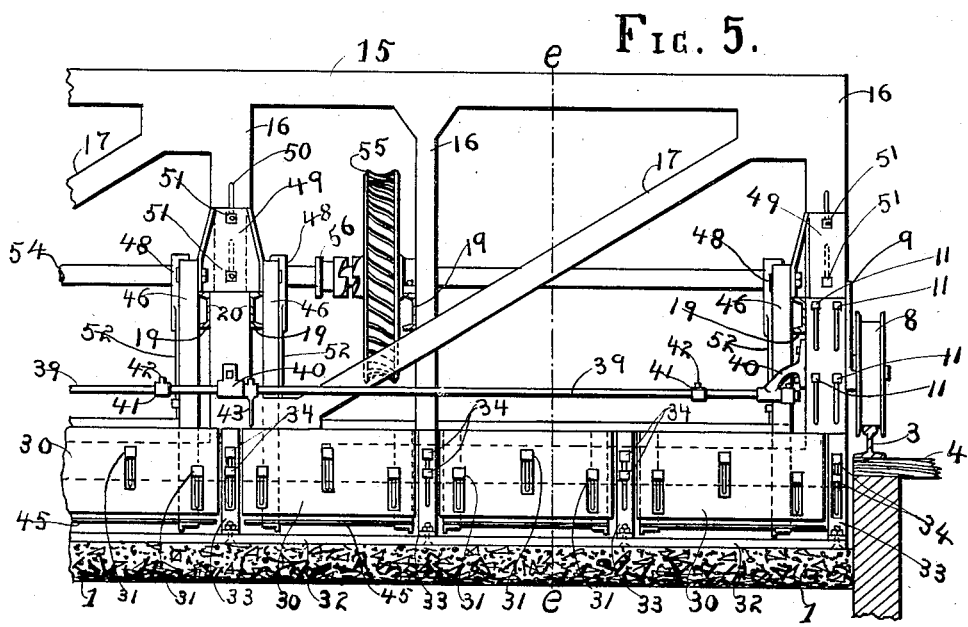
Figure 10:
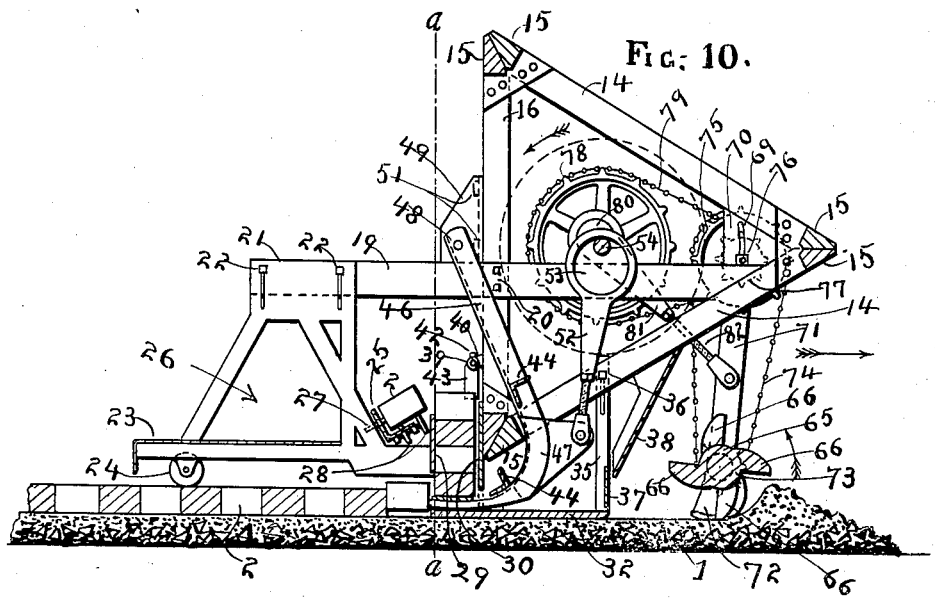
Figure 11:
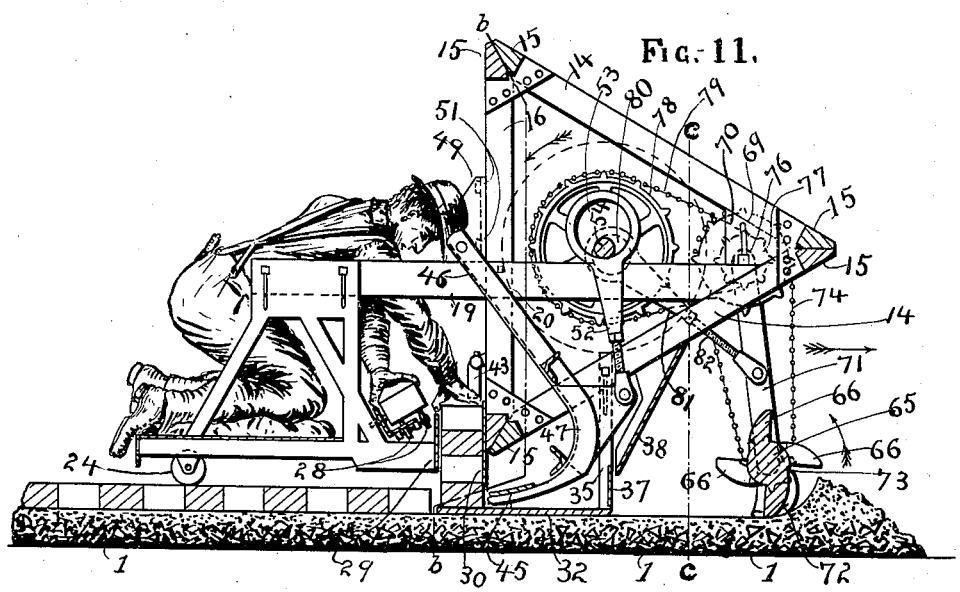
Figure 18:
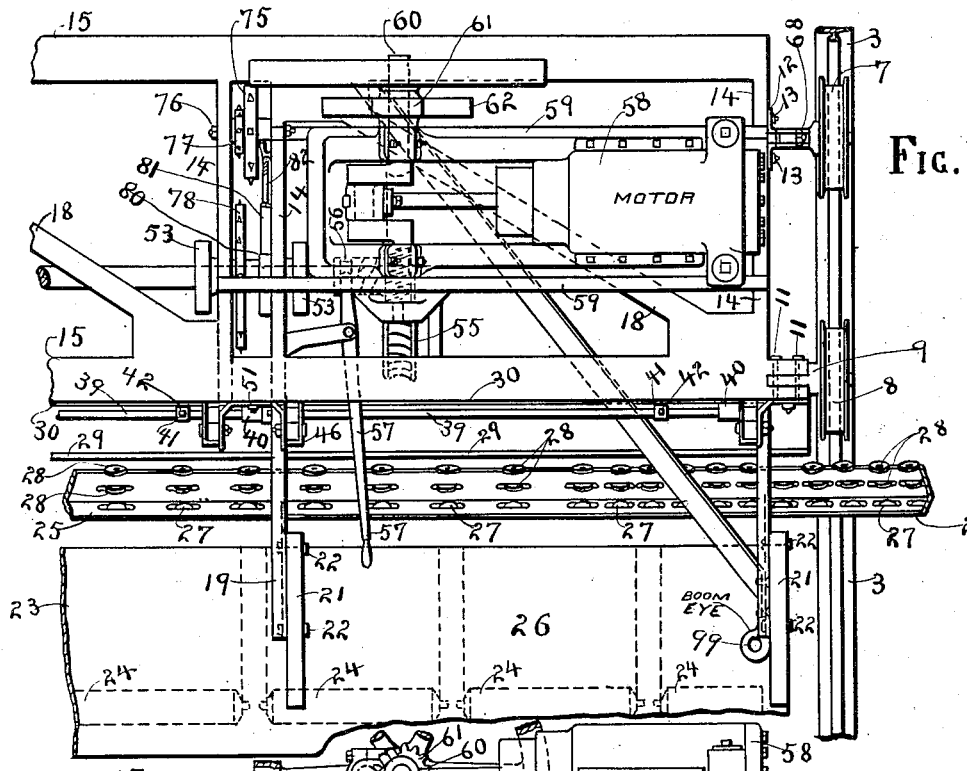
Figure 19:
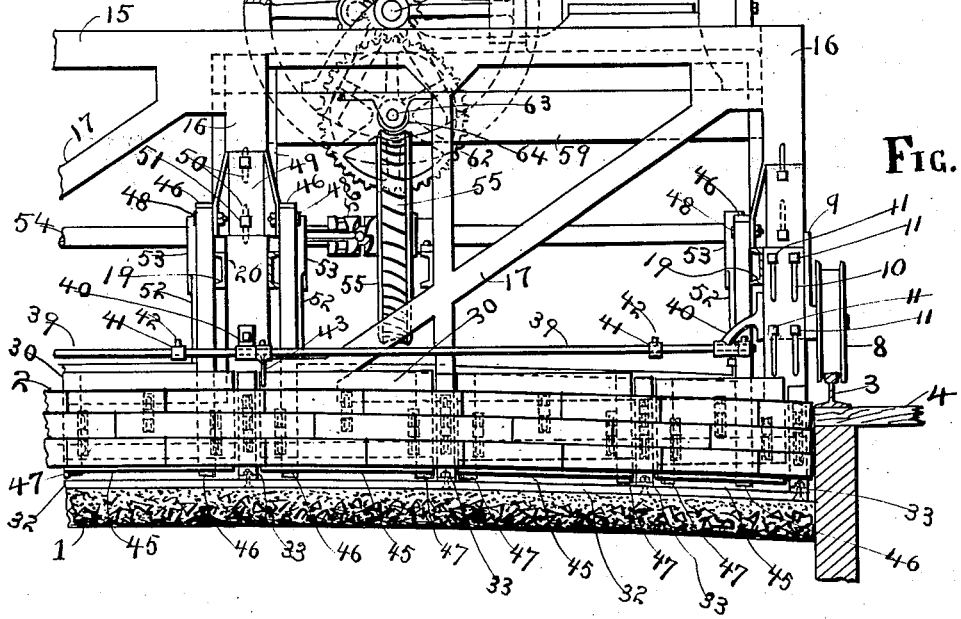

In the drawings Figure 1 is a plan view of my apparatus generally, with the tracks laid at the side of a road or street bed which is to be paved; Fig. 2, a detail rear elevation of the guide booms and rollers, with the track and adjacent portions of curb and gutter in section; Fig. 3 is a rear elevation of my apparatus, showing a street or roadway in transverse section, with the machine in position to work; Fig. 4, a similar rear elevation, on a larger scale, showing a portion of the apparatus, particularly the struts and ties of the frame, the paving block receiver or feeder and the packing rollers; Fig. 5, a transverse vertical section on the line *a a* of Fig. 10, looking toward the front of the machine and showing particularly the adjustable plates that form the front wall of the paving block holding hopper, the gagerod for setting the blocks in the hopper in a manner to result in breaking joints in the pavement and the master or main shaft, with its worm wheel and other features; Fig. 6, a similar transverse vertical section taken on the line *b b* of Fig. 11, also looking forward, and showing, on an enlarged scale, particularly the ejector for ejecting the blocks from the holding hopper to paving-position, the master shaft, with its worm gear and eccentric devices, whereby the ejector is given motion; Fig. 7, another transverse vertical section on the line *c c* of Fig. 11, looking forward, taking in a part of the width of the machine and showing particularly the forward end of the frame, the striker or spreader for leveling the grouting or top coating of the foundation and its hangers, by which it is suspended from the frame; Fig. 8, an enlarged axial sectional view of a portion of the two adjoining sections of the striker or spreader, showing the universal joint connecting the sections, the sprocket pinion and the hanger; Fig. 9, a detail sectional view of the universal joint on the line *d d* of Fig. 8, showing also the sprocket pinion in elevation; Fig. 10, a longitudinal vertical section through the machine generally, taken on the line *e e* of Fig. 5, showing a paving block just ejected out over the paving bed, ready to drop, with the preceding forward step of the machine just ended, the forward motion of the striker or leveler just commencing, and the blocks just dropped onto the ejector; Fig. 11, a like section taken in the same plane as Fig. 10, but showing the machine with the forward motion of the striker or leveler completed, the ejector withdrawn and the blocks settled down on the bottom plate and the machine just ready to commence its forward movement bodily; Figs. 12 to 15 inclusive, vertical sectional views, in a longitudinal direction, in the same plane as Figs. 10 and 11, each showing the holding hopper, the ejector, the bottom plate of the machine, the adjacent blocks already laid and the striker or spreader, Fig. 12 showing the ejector ready to begin ejecting and the rotary striker or spreader just finished advancing; Fig. 13 showing the lower row of blocks just brought in contact with the previously laid row in the street, and the forward movement of the machine bodily just commencing, the striker or leveler being inactive; Fig. 14 showing the machine advanced about one-half its forward movement and the upper blocks commencing to drop to the ejector, the spreader or leveler being still inactive; Fig. 15 showing the machine with the forward movement finished, the ejector commencing to recede, the blocks just dropping onto the bed and the striker or leveler just commencing to advance to reach the heap of top bedding to be distributed; Fig. 16, a rear view, on an enlarged scale, of a portion of the ejector; Fig. 17, a side elevation of the ejector; Fig. 18, a plan view, on an enlarged scale, of the machine generally, with one end broken off; Fig. 19, a rear elevation and section on line $a\ a$ Fig. 10, on an enlarged scale, with one end broken off, showing the machine adjusted to a street or road-bed with a curved cross-section; Fig. 20 a side elevation of the machine generally, of Fig. 1; Fig. 21, an edge view of one of the supporting wheels, with its spindle and attaching bracket; Fig. 22, a side elevation of the same parts; Fig. 23, a vertical longitudinal section of the machine, showing a modification, wherein the blocks are delivered from the receiver into the hopper automatically, wherein a liquid is automatically discharged upon the paving bed and sand automatically discharged upon the laid blocks; and Fig. 24, a detail enlarged view of the automatic block transferrer, showing it in full and dotted line positions and the block hopper in part.

Referring particularly to Figs. 1 and 3, the numeral 1 designates a road or street paving bed suitably prepared to receive thereon the paving blocks indicated at 2. At either side of the bed I place rails 3 held by cross-ties 4, which are connected by a beam 5. These are in sections, so that they can be readily taken up as the machine advances and the rear sections laid on ahead. To facilitate this the beams 5 are provided with wheels 6, on which they can be rolled along. These sections are staked down, say to the ground, and the rails are spiked to the cross-ties 4. The apparatus is supported by forward wheels 7 and rear wheels 8, which travel on these rails. The connection of the wheel spindles with the general frame is adjustable, so as to accommodate the machine to local conditions. Referring to Figs. 18 to 22, it will be seen that the wheels 8 have a spindle provided with a plate 9, which fits between struts 16 of the general frame, and is held by bolts 11 passing through the holes in the plate and through slots 10 in the struts 16. In this way the adjustment of the frame relatively to the wheel is effected. The wheels 7 are mounted on studs carried by the slotted plates 12, held by bolts 13 to the general frame. This affords adjustment at that point. This frame is composed of three trusses, one vertical and two inclined, secured together at chords 15 which lie face to face and are suitably connected, and consist of struts 14 and 16 and ties 17, see Fig. 3, as also ties 18, see Figs. 1 and 18. This resulting triangular frame is very strong, while not unduly heavy, and may be made of metal or wood, the former preferred, say of angle-iron structure. Horizontal channels 19 are secured at their forward ends to the lower struts 14 and at their intermediate portions to the struts 16 at the point 20. The rear extensions of the channels 19 support depending plates 21, which are adjustable through the means of slots and bolts 22 and which carry the operators' platform 23, the rollers 24 for settling the blocks after they are laid and the block chute or feeder 25, which latter is a transverse trough having its ends inclined upward, as seen in Fig. 3, so that as the paving blocks are fed into it by hand, they will gravitate inward until the whole chute or feeder is filled. I speak of it as a chute or feeder because it feeds the blocks to the points on the apparatus occupied by the operators, who are scattered along at the points indicated by 26; see Figs. 1 and 11. This chute or feeder is preferably provided with a series of rollers 27 and 28, which operate to reduce the friction and make the blocks move more freely. The operators lift these blocks over into the holding hopper, composed of a trough-like structure extending across the machine immediately in front or near to the feeder. It consists of a rear wall 29, secured to the forward ends of the plates 21, and of a forward wall 30, made in sections and each section connected to one of the lower chords 15 by means of slots and bolts 31; see Figs. 5 and 19 particularly. By these means the wall 30 can be raised and lowered, being made in sections, as seen in Figs. 5 and 19, to substantially conform in position to the contour of the paving-bed in cross-section, say when the bed is flat, as seen in Figs. 3 and 5, or curved, as in Fig. 19. The wall 29 of the holding hopper is adjusted along with the operators' platform to conform to the paving-bed. The bottom plate 32 likewise extends across the machine and is capable of being raised or lowered by the straps 33, to which it is attached and which in turn are adjustably connected by means of slots and bolts 34 to the lower rear chords 15; see particularly Figs. 5 and 19. In this manner the varying contours of the paving beds, whether straight or curved, are accommodated by the machine. Incidentally the function of the bottom plate 32 of the machine is to smooth the paving bed immediately before the blocks reach it. The rear portion of this plate is attached in the manner just stated. The forward edge is similarly secured by straps 35, adjustably secured to the lower struts 14 by bolts and slots 36; see Fig. 10. A guard-plate 37 extends along the front edge of the plate 32 to prevent the top layer from being splashed or thrown over on the plate, and a similar guard or dash 38 likewise protects the machinery behind it.

It will now be seen that the apparatus comprises a strong wide frame, which travels just over the paving-bed and carries the several operators on the platforms 23, the block receiver and the block hopper, besides the other mechanism now to be described.

Referring to Figs. 5 and 19, it will be seen that there extends across the machine a gage-rod 39, slidably mounted in brackets 40 secured to a convenient part of the frame and having adjustable collars 41, fastened by set-screws 42 to limit the movements of the rod. At suitable points the rod has gage fingers 43. By sliding the rod until the collars strike the brackets, on one side, the operators can tell, by observing the gage fingers, where to place one row of blocks, and by sliding it until the collars strike the other side of the bracket, they can tell where to place the next row, and so on, alternately gaging one row and then the other, so that the different tiers will break joints with each other when laid. For instance, the first tier of blocks will extend from one margin of the paving bed to the other. This will bring the joints between their abutting ends at certain places. Then when the next tier of blocks is to be laid, the blocks at the ends should start at a point inward from the margins of the bed, to break the joints. To do this they must be so placed in the hopper. To so place them in the hopper, a guide or gage is expedient. This is afforded by the block-gage just described.

I will next refer to the means for ejecting the blocks from the hopper back into paving position and which also acts to advance the machine a step forward after a tier of blocks has reached paving position. This means consists of an ejector, which comprises a frame extending across the machine, preferably just forward of the hopper. It is made of transverse plates 44 and 45 and vertical arms 46, with connecting pieces 47 at intervals. The arms 46 are pivotally hung on studs 48, secured on plates 49 carried by the frame over the hopper. The frame is slotted as seen at 50 and the plates are adjustably held by the bolts 51. This adjustment is for the same purpose as that relating to the forward wall of the block hopper and the bottom plate of the machine, namely, to make the ejectors conform substantially to the cross-section of the bed to be paved. For this purpose the ejector is made in sections. There is one section between each two struts 16, although the ejecting plate proper, 45, is practically continuous, its ends between two sections being so close that a block cannot slip between them. At each end of each section it is connected with operating means, as shown in Figs. 5, 10 and 11. One form of such operating means, that shown, consists of an eccentric-rod 52, connected to the ejector and operated by the eccentrics 53 on the master shaft 54. These eccentrics are so set that they act to advance and withdraw the ejector, that is, all the sections, at the proper intervals, as hereinafter explained. The function of the ejector is to force a tier of blocks from the bottom of the hopper and off of the bottom plate 32 of the machine, as shown in Figs. 10 to 15, and to advance the machine forward by continued pressure on the blocks after they have come against those already laid, which act as a resistance, so that the continued stroke of the ejector forces the machine forward one step. Then when the ejector is withdrawn, that tier of blocks descends upon the bed and, when the ejector has moved far enough, as in Figs. 11 and 12, the several tiers of rows of blocks will settle down by gravity and bring another tier opposite the ejector.

I will now refer to the operating means for driving the master shaft and then to the leveler or spreader. The master shaft 54 is mounted in suitable bearings on the channels 19, or other part of the frame. It carries a worm gear 55, loose on the shaft, and a clutch 56, slidable on the shaft, but rotatable with it, which, through a lever 57, see Fig. 18, is made to engage and disengage with the clutch face on the worm gear. A suitable motor or engine, say a gasolene engine, 58 is supported on a platform 59 on the frame. The shaft 60 of this motor or engine carries a pinion 61, which meshes with a gear wheel 62 mounted on an intermediate shaft 63, carried in bearings beneath the platform 59 and having a worm 64 which meshes with the worm gear 55. See Figs. 18–20. This is one convenient mode of generating the power and applying it to the master shaft and from it to the ejector, through the eccentrics 53 and their rods 52.

I will now refer to the striker or spreader by which the top layer of the paving bed is spread in advance of the machine. This device is composed of several rotatable shafts 65, with wings or blades 66. The sections are interconnected by any approved type of universal joint, as that shown in Figs. 8 and 9, so that the several sections will constitute one entire striker or spreader and so that it may be adjusted up or down at intervals across the machine to conform its outline to substantially that of the paving-bed in cross-section. The means for suspending the striker or spreader comprises hangers or links 67, in the lower ends of which the shaft 65 is journaled, while their upper ends are pivoted to the frame by bolts 68, see Figs. 7, 10, 11. These bolts are in slots 69, formed in the plates 70 which form the connection between the struts of the frame, near their forward meeting ends. By this means the hanger 67 can be raised and lowered. This description applies to the hanger at the outer ends of the striker or spreader. The connection of the intermediate hangers 71 with the supporting frame is by means of the shafts 76, which, like the bolts 68, may be adjusted vertically for setting the striker or spreader to conform substantially with the contour of the paving-bed. The foot of each of the several hangers forms a smoother 72, so as to act the same as the wing 66 at points to which the wings do not extend.

The striker or spreader has two motions. One is a rotary motion, to cause it to spread the advanced pile of material constituting the top coat of the paving-bed. The other is a bodily advancing movement, so that it will proceed farther and farther into the pile. These two motions are accomplished as follows:—One or more sprocket pinions 73 are provided on the striker or spreader, and sprocket chains 74 rotate them from sprocket wheels 75 mounted on the shaft 76. A sprocket pinion 77, connected with the sprocket wheel 75, receives rotary motion from a sprocket wheel 78 mounted on the master shaft 54, through a sprocket chain 79. In this manner rotary motion is given the striker or spreader. The advancing movement is given it by means of eccentrics 80 secured to the master shaft, and operating eccentric-rods 81, which are connected to the hangers 67. These eccentric-rods are adjustable in length, by means of a screw-threaded section 82.

It is to be noted that the throw of the eccentrics 53 and 80 is such that when the eccentrics 53 are operating the ejector rearwardly, the eccentrics 80 do not advance the striker or spreader, but that, when the rearward movement of the ejector ends and the machine has been bodily advanced forward one step, then the eccentrics 80 commence to advance the striker or spreader forward and continue to advance it until the ejector begins to force another row of blocks out of the hopper, at which time the advancing movement of the striker or spreader ceases, though it continues to rotate. In this way power is economized, as it is alternately applied first to operating the ejector, to force the blocks from the hopper into paving-position, and advance the machine, and then, after that, applied to advancing the striker or spreader. This is an important consideration in practice, although, of course, my invention is not limited to the inclusion of this order of the use of the power.

Referring to the modification shown in Figs. 23 and 24, it will be seen that I have added two hoppers, one, 83, for containing a solution of cement and water, to make a better bed for the paving blocks to rest upon, and the other, 84, to contain sand, which will be discharged upon the top of the blocks after they are laid, for the usual purpose of working into the joints to solidify the work. The hopper 83 extends, at its discharge orifice 85, slightly below the bottom plate 32 of the machine, so as to give room for the liquid coat to work back under it. A reciprocating agitating rod 86 is operated by a rock-shaft 87, mounted on the main frame and receiving motion from a cam, say 80$^a$. In the hopper 85 is a rotary agitator and broken flight screw conveyer 88, operated by a sprocket wheel 89, sprocket-chain 90 and sprocket pinion 91, mounted on the master shaft 54. Another feature in this modified machine is means for automatically moving the paving blocks from the feeding chute 25 into the block hopper, instead of performing that function by hand. I term this device a block-mover or pusher. It is designated at 92 and consists of an arm pivoted to a plate 97$^a$, one secured to each channel 19 of the machine, and having at its lower end a right-angled plate 93 to form a sort of pocket to fit over the block in pushing it. It also carries a shield 94, which stands across the chute and prevents incoming blocks from passing into the plane of movement of the pusher and interfering with its return to normal position. The block pusher is operated in any suitable manner, as by eccentrics 95 mounted on the master shaft and operating rods 96. These eccentrics are set to properly time the action of the block pushers.

While I have shown means for pushing the blocks into position it will be obvious that they might be otherwise placed in position and still be within the limits of my invention.

In Fig. 24 I have shown the block pusher in two positions, the inactive position in full lines and the advanced position, having just pushed a block into the hopper, in dotted lines. One or more of these additional features may be incorporated in the machine.

Referring now to the general operation of my apparatus, it will be seen and understood that, as the paving blocks work down the chute 25, either to the operators or to the automatic block pusher 92, they are delivered over into the block hopper, one tier upon another, as many as may be desired. Then the ejector moves into contact with the lower tier of blocks and forces them rearward and progressively, as illustrated in Figs. 12–14. The continued movement of the ejector after this tier of blocks has reached its limit, acts to advance the machine bodily one step. This action of the ejector forces the blocks firmly into paving position, whence they settle down, being driven to their final level by the oncoming pressure rollers 24, which level all the blocks alike. Then when the ejector has about reached its rearward limit, the striker or spreader in turn advances forward, the meantime rotating, and levels or spreads another stretch of material used in the top coat of the paving-bed. This material may be sand or it may be a special grouting, composed, for instance, of one part cement, three of sand and five of broken stone, mixed with water. It is feasible to use this grouting with this machine. And in case of the use of the hopper 83, the top coat may be supplied with the liquid cement, whether such coat be sand or this grouting. By the time the striker or spreader shall have sufficiently leveled a portion of the top coat, the ejector will resume its rearward movement and repeat the operation above described. It will be observed too that as the ejector withdraws from the block hopper, the tiers of blocks settle down until the lower tier reaches the base plate 32 of the machine. Thus the paving operation is continued and is automatic, with the exception of feeding the blocks from the chute into the hopper by hand, when men are employed, or is wholly automatic, when the blocks are pushed by the automatic pusher from the chute into the hopper. And it will be noted that at one and the same time a course of blocks is laid across the entire street or roadway and that there is no lost time in the operations of the machine, so that its capacity is very great and it will lay a long stretch of blocks in the course of a day.

I have used the terms chute or feeding chute as applied to the means for conducting the block across the machine into convenient proximity to the hopper; have used the term hopper or block hopper in referring to the receptacle or part of the machine where they are received and held prior to being ejected into paving-position; have used the term ejector as applied to the means for moving the blocks into paving position and to advancing the machine forward; and have used the term striker or spreader as applied to the device for leveling the top coat in advance of the machine. But it is to be understood that any other devices, differing from these so widely as to bear other names, are nevertheless within my invention. Again, it is to be understood that any suitable means may be utilized for advancing the machine forward, either continuously or step by step.

I conceive myself to be the first to devise a machine whereby this important result of paving with blocks may be accomplished mechanically, as distinguished from the old hand-laying, and wish to be understood as claiming such apparatus in broad terms.

Referring to Figs. 1 and 2, it will be seen that I pivotally connect guiding booms 97 and 98 to the main frame, say at the point 99, and also connect these booms together, at the point 100, where they are equipped with three wheels 101, two of which run on the sides of the rail and the other on the top. This is a guiding device and in practice operates to keep the machine from shifting back and forth at either end, as also to properly guide it along a curve in the tracks, should there be one. This is a very useful, though not an indispensable adjunct.

The terms blocks and paving blocks are intended to cover any material the machine is capable of handling for paving purposes. With modifications, asphalt *en masse* may be laid or spread by this apparatus, but an apparatus specially organized for paving with that material will form the subject of a separate application.

The grout may be mixed and dropped in front of the apparatus in any desired manner.

Having thus fully described my invention, what I claim as new and desire to secure by Letters Patent, is:—

1. In a paving apparatus, a bridge-like main frame supportable at the sides of the paving-bed and movable relatively to and over the paving-bed, means carried by said frame to receive and hold the paving blocks, and positive means to cause the blocks to move thence into paving position.

2. In a paving apparatus, a bridge-like main frame supportable at the sides of the paving-bed and movable relatively to and over the paving-bed, means carried by said main frame to receive and hold the paving blocks, positive means to cause the blocks to move thence into paving position and to advance the apparatus for each time the blocks reach paving position.

3. In a paving apparatus, a bridge-like main frame supportable at the sides of the paving-bed and movable relatively to and over the paving-bed, means carried by said main frame to receive and hold the paving blocks, means to cause the blocks to move thence into paving position and to advance the apparatus for each time the blocks reach paving position, and other means to spread the top coat of the paving-bed in advance of the apparatus.

4. In a paving apparatus, a bridge-like main frame supportable at the sides of the paving-bed and movable relatively to and over the paving-bed, means carried by said frame to receive and hold the paving blocks, means to cause the blocks to move thence into paving position, means to advance the apparatus each time the blocks reach paving position, means to spread the top coat of the paving-bed in advance of the apparatus, and means to pack or press down the blocks as the machine advances.

5. In a paving apparatus, a bridge-like main frame supportable at the sides of the paving-bed and movable relatively to and over the paving-bed, means carried by said frame to receive and hold the paving blocks, means to cause the blocks to move thence into paving position, means to advance the apparatus each time the blocks reach paving position, means to spread the top coat of the paving-bed in advance of the apparatus, and power means to actuate the forward moving means and the spreading means at different times.

6. In a paving apparatus, a bridge-like main frame supportable at the sides of the paving-bed and movable relatively to and over the paving-bed, block-receiving and holding means, block-moving means acting to move the blocks into paving position and further acting against the blocks to advance the apparatus.

7. In a paving apparatus, a bridge-like main frame supportable at the sides of the paving-bed and movable relatively to and over the paving-bed, means to receive and hold paving blocks in a paving-line, and means to cause a line of blocks to move thence into paving position.

8. In a paving apparatus, a main frame supportable and movable relatively to the paving-bed, means to deliver a line of paving blocks on said apparatus, means to receive and hold said blocks in paving line, and means to cause said line of blocks to move thence into paving position.

9. In a paving apparatus, a main frame supportable and movable relatively to a paving-bed, means to deliver a line of paving blocks on said apparatus, means to receive and hold said blocks in paving-line, means to cause said line of blocks to move thence into paving position, said means acting also to advance the machine one step, and other means for spreading the top coat of the paving-bed in advance of the apparatus.

10. In a paving apparatus, a main frame supportable and movable relatively to a paving-bed, a block-chute to receive and deliver the paving blocks in a line along the apparatus, a block-hopper to receive and hold the blocks in paving-line, and an ejector to move the blocks thence into paving position.

11. In a paving apparatus, a main frame supportable and movable relatively to a paving-bed, a block-chute to receive and deliver the blocks in a line along the apparatus, a block hopper to receive and hold the blocks in paving-line across the apparatus, an ejector operating transversely through the hopper to move the blocks thence into paving position.

12. In a paving apparatus, a main frame supportable and movable relatively to a paving-bed, a block-chute to receive and deliver the blocks in a line across the apparatus, a block-hopper adjacent to the chute to receive and hold the blocks in paving line, across the apparatus, an ejector operating transversely through the hopper to move a line of blocks thence into paving-position against a line of blocks previously laid, and acting by continued pressure against the blocks to advance the apparatus a step.

13. In a paving apparatus, a main frame supportable and movable relatively to a paving-bed, a block-chute to receive and deliver the blocks in a transverse line on the apparatus, a block-hopper to receive and hold the blocks in paving line across the apparatus, an ejector operating transversely through the hopper to move a line of blocks thence into paving position, and acting by continued pressure against the blocks to advance the machine a step, a spreader in advance of the machine to spread the top coat, a power means to operate the ejector and spreader alternately.

14. In a paving apparatus, a main frame supportable and movable over the paving-bed, a transverse block-chute and a transverse block-hopper, means behind the hopper to press down the blocks, a pivoted swinging ejector adapted to project transversely through the bottom of the hopper and engage a row of blocks to move them thence into paving-position, power means to operate the ejector, first to so move the blocks and then by continued pressure to advance the apparatus a step, and a spreader in advance of the hopper adapted to rotate and to advance forwardly, and connections between the power means and the spreader to advance it into action when the ejector recedes out of action.

15. In a paving apparatus, a main frame supportable and movable over a paving-bed, an ejector, a positively actuated spreader, and power means connected with said ejector and said spreader to actuate the ejector to advance the apparatus a step and to advance the spreader each time the apparatus is so advanced.

16. In a paving apparatus, a main frame, block laying devices supported thereby, and a spreader supported in front of said block-laying devices and adapted to engage the material forming the top layer of the paving bed and spread the same in advance of said block laying devices.

17. In a paving apparatus, a main frame, block-laying devices supported thereby, and a vertically adjustable spreader supported in front of said block-laying devices.

18. In a paving apparatus, a main frame supportable and movable over a paving-bed, an ejector adapted to be moved against a fixed object, a spreader adapted to be advanced, and power means connected up with the ejector and the spreader and arranged to alternately operate them to advance the machine by the ejector and to advance the spreader afterward.

19. In a paving apparatus, a main frame supportable and movable over a paving-bed, an ejector pivoted at one end and adapted at the other to be moved against the paving blocks, to set them firmly in paving position and by continued pressure to advance the machine forward, a swinging spreader carried by the frame, power means to rotate the spreader and to alternately move the ejector as stated and then to advance the spreader.

20. In a paving apparatus, a main frame, a motor, a master shaft operated thereby, eccentrics on said shaft and having eccentric-rods which the eccentrics alternately thrust, an ejector connected to one or more of said rods and adapted to be moved thereby, and a spreader connected to other of said rods and adapted to be advanced thereby, the eccentrics being set to alternately move and advance the ejector and spreader.

21. In a paving apparatus, a main frame, a motor, and driving mechanism, block-laying devices connected with said frame, a swinging spreader connected with said frame and adapted to be advanced relatively to said block-laying devices and to engage the material forming the top layer of the paving-bed in front of said block-laying devices and spread the same, and a connection between said spreader and the driving mechanism to advance the spreader.

22. In a paving apparatus, a main frame, a motor and driving mechanism, a swinging and rotatable spreader carried by the frame, a connection between the spreader and driving mechanism to rotate the spreader, and another connection between them to advance the spreader.

23. In a paving apparatus, a main frame, a block-hopper, adapted to receive one or more tiers of lines of blocks, an ejector adapted to eject the blocks, a line at a time, from the hopper, thence into paving position, and means to operate the ejector.

24. In a paving apparatus, a main frame, a block-hopper adapted to receive one or more tiers of lines of blocks, an ejector adapted to pass across the bottom of the hopper to eject therefrom a line of blocks and to receive thereon the next tier of blocks, a bottom plate on the apparatus to receive the bottom tier of blocks when the ejector recedes, and means to operate the ejector.

25. In a paving apparatus, a block-hopper adapted to receive tiers of lines of blocks, a block-chute adapted to deliver the blocks near to the hopper, a platform for one or more operators who fill the hopper from the chute, pressure or packing rolls to solidify the set blocks, and an ejector adapted to eject a line of blocks at a time from the hopper into paving position, and means to operate the ejector.

26. In a paving apparatus, a block-hopper adapted to contain one or more blocks, and an ejector movable toward and from said hopper to eject blocks from the hopper into paving-position forcibly against the preceding blocks to effect a close setting of the blocks together on the bed.

27. In a paving apparatus, a transverse block-chute having block-carrying rollers mounted thereon and extending within the same to receive and transmit the blocks.

28. In a paving apparatus, a pivoted swinging ejector made in sections and having the pivot supports adjustable relatively to the paving-bed for the purpose described.

29. In a paving apparatus, a main frame, supporting wheels therefor, removable tracks adapted to be located near the margins of the road-bed to support the apparatus over and above said bed and block-laying devices carried by said main frame.

30. In a paving apparatus, a main frame adapted to bridge or span the paving-bed and block-laying devices carried by said main frame and having means to support it.

31. In a paving apparatus, a main frame adapted to bridge or span a paving-bed and means to support said frame beyond the margins of said bed and block-laying devices carried by said main frame.

32. In a paving apparatus, a main frame, a track, supports for said main frame arranged to travel on said track, and a steering or guiding device connected with the frame and engaging the track to control the guiding of the frame.

33. In a paving apparatus, a main frame and a track therefor, a guiding device composed of booms extending rearwardly and obliquely, and having rollers which travel against a rail of the track.

34. In a paving apparatus, a main frame, a removable track therefor, and a steering device composed of booms extending rearwardly and obliquely and having rollers which engage a rail of the track, one of the booms being longitudinally adjustable to adjust the steering of the frame.

35. In a paving apparatus, a bridge-like main frame arranged to span a paving-bed, means for laying the blocks and for advancing the machine as the paving progresses, a motor mounted on said frame, and means to transmit motion from said motor to active parts of the apparatus, whereby the apparatus is self-contained and continuous in operation.

36. In a paving apparatus, a main frame consisting of inclined struts, an ejector supported from the struts, vertical struts, horizontal chords, a holding hopper supported therefrom, and diagonal ties adapting it to bridge or span a paving-bed, and means to movably support said frame.

37. In a paving apparatus, a main frame adapted to bridge or span the paving bed, supports therefor near the margins of the bed, a transverse block-hopper, a transverse ejector and transverse pressure rolls each vertically adjustable relatively to the bed.

38. In a paving apparatus, a main frame, a transverse block-chute having inclined terminals to cause the blocks to gravitate across the apparatus.

39. In a paving apparatus, a main frame, a block-hopper, a block-chute, and a block-pusher, and means to operate the pusher to cause it to transfer the blocks from the chute to the hopper.

40. In a paving apparatus, a main frame, a block-hopper, a block-chute, a swinging block-pusher having wings, and means to operate the pusher to transfer the blocks from the chute to the hopper, the wings being adapted to keep other blocks out of the plane of the pusher during its movements.

41. In a paving apparatus, a main frame, a liquid hopper connected thereto whereby a paving bed may be provided, and means to control the discharge orifice thereof, a holding hopper, and an ejector in the rear of such liquid hopper to deliver the blocks on such bed.

42. In a paving apparatus, a main frame and a sand hopper, with means to control the discharge of sand therefrom, and a holding hopper and an ejector in advance thereof, to deliver blocks to be sanded.

43. In a paving apparatus, a main frame, block-laying devices carried thereby a liquid hopper in advance of the paving point, and a sand hopper in the rear of said point, whereby the bed may be liquefied and the laid blocks may be sanded.

44. In a paving apparatus, a main frame consisting of a substantially vertical and other inclined trusses to constitute a triangular structure in cross-section.

45. In a paving apparatus, a block hopper and a gage to indicate the position in which to place the blocks in the hopper to cause the blocks to break joint when laid.

46. In a paving apparatus, a block hopper extending from side to side of the apparatus, and a gage-rod likewise extending and having gage fingers adapted, by adjusting the rod to indicate the place in the hopper at which to place certain of the blocks, so that all of the row of blocks will break joints with a previous row of blocks.

47. In a paving apparatus, a bridge-like main frame having means to suspend it over and allow it to move along a paving-bed, means carried by said frame and conforming substantially to the transverse line of the bed to receive and hold the paving blocks in transverse series, and other means also conforming substantially to the transverse line of the paving-bed to cause the blocks to move into paving position, said receiving and holding means and said moving means being held over, above and within the lateral limits of the paving-bed.

48. In a paving apparatus, a bridge-like main frame having means to suspend it over and allow it to move along a paving-bed, means carried by said frame and conforming substantially to the transverse line of the bed to receive and hold the paving blocks in transverse series, and other means also conforming substantially to the transverse line of the paving-bed to cause the blocks to move into paving position and to advance the machine, said holding means and said moving means being held over, above and within the lateral limits of the paving-bed, and means to supply a line of paving blocks for delivery to said receiving and holding means.

49. In a paving apparatus, supportable and movable relatively to a paving bed, a smoothing bottom, a spreader preceding said smoothing bottom, and block laying devices following said smoothing bottom.

50. In a paving apparatus, supportable and movable relatively to a paving bed, a smoothing bottom, a spreader preceding said smoothing bottom, block laying devices following said smoothing bottom, and block setting devices.

51. In a paving apparatus, supportable and movable relatively to a paving bed, a smoothing bottom, block laying devices and block setting devices following said smoothing bottom.

52. In a paving apparatus, supportable and movable relatively to a paving bed, a smoothing bottom, and block laying devices following said smoothing bottom.

In testimony whereof, I affix my signature in presence of two witnesses.

WILLIAM BAYLEY.

Witnesses:
E. O. HAGAN,
F. W. SCHAEFER.